United States Patent Office 3,669,723
Patented June 13, 1972

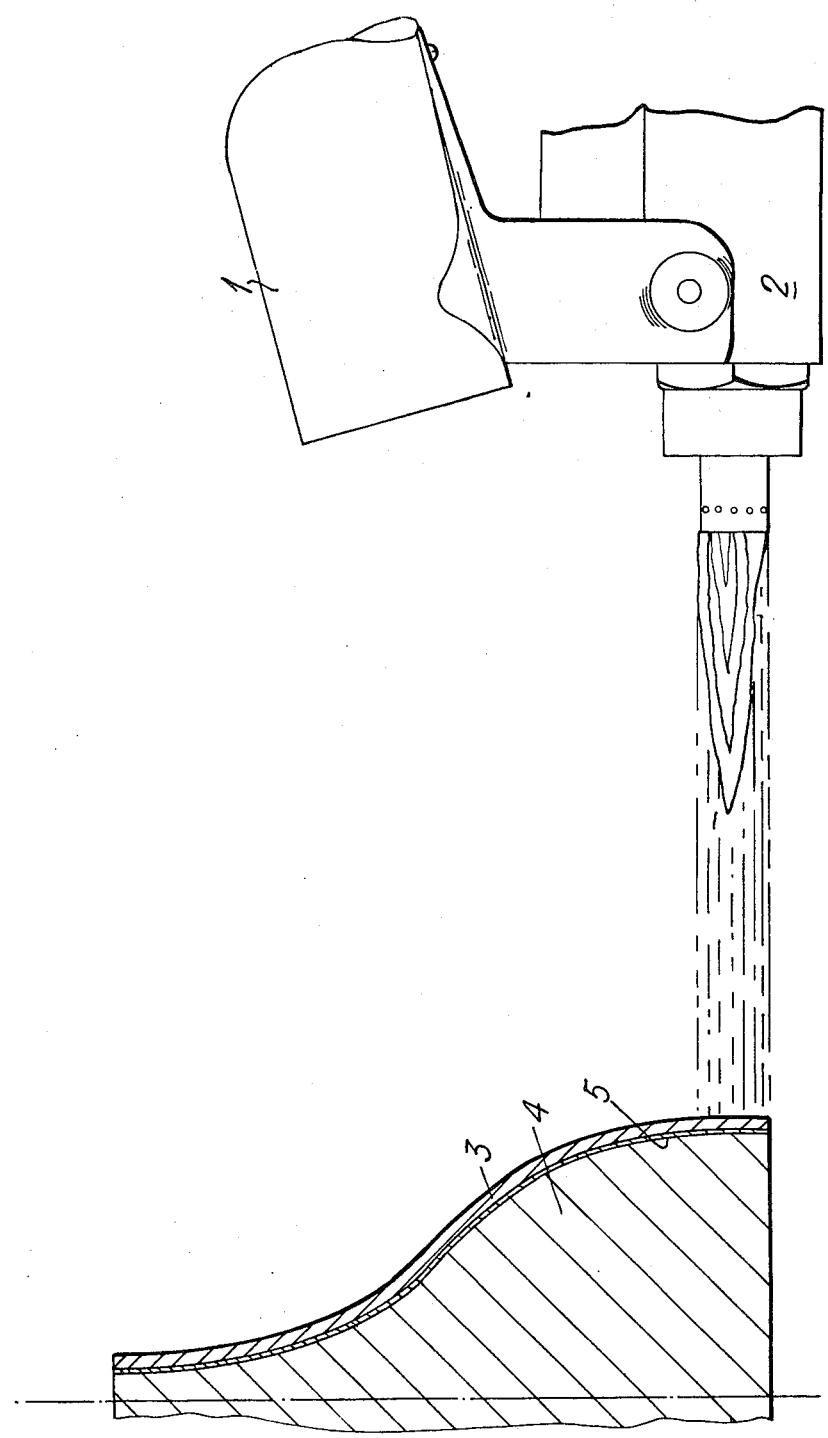

---

3,669,723
SPRAY DEPOSITION OF SILICON POWDER STRUCTURES
Norman Lawrence Parr, Shepherds Croft Ridge, Wareham, England, and Robin Lawford Brown, 44 Leybourne Ave., Ensbury Park, Bournemouth, England
Continuation of application Ser. No. 614,855, Feb. 9, 1967. This application Jan. 21, 1970, Ser. No. 4,449
Claims priority, application Great Britain, Feb. 9, 1966, 5,565/66
Int. Cl. B44d 1/097
U.S. Cl. 117—105.2
2 Claims

ABSTRACT OF THE DISCLOSURE

Spray deposition of silicon powder by projection from a flame gun on to a preheated former, which may be capable of being rotated or reciprocated to facilitate continuous and even deposition of silicon powder on the former. The former may be formed of silicon or silicon nitride, in which case both the former and the silicon compact formed thereon by the projected powder are heated in an atmosphere of nitrogen or ammonia to convert the silicon to silicon nitride. As an alternative, the former is coated with a soluble release agent before spraying and the former and compact formed thereon are immersed in a solvent to dissolve the soluble release agent to release the compact, which is then heated in an atmosphere of nitrogen or ammonia to convert the silicon to silicon nitride.

---

This application is a continuation of our copending application Ser. No. 614,855, filed Feb. 9, 1967, and now abandoned.

This invention relates to a method for producing engineering components in silicon nitride to close tolerance by compacting silicon powder on to a shaped former by spray deposition techniques. Using this method it is possible to produce cheaply final shapes of intricate pattern having good surface finish and close tolerance.

Silicon powder of blended particle size is fed from a hopper and projected on to a preheated metal former, previously coated with a soluble release agent such as sodium chloride, through a high velocity oxyhydrogen or oxyacetylene flame spray gun. The preheated former may be arranged to rotate or reciprocate in order to facilitate the continuous and even deposition of the powder to the desired thickness. The spray gun may also be moved synchronously with the former to assist the desired deposition.

Light machining operations may be carried out on the surface of the powder deposit while it is still supported by the former using conventional tools or abrasives. The release of the shaped compact is produced by dissolving the release agent i.e. by immersing in water in the case of sodium chloride; the released silicon compact, which is fragile but strong enough to be handled lightly, is then further soaked in running water to remove all trace of salt and is then oven dried in air at 120° C. If further machining operations are required before conversion to silicon nitride, the compact is first lightly reacted by heating in a reducing atmosphere such as nitrogen or ammonia to a bisque sufficiently strong to enable it to be held in the jaws of a machine, but still soft enough to permit the further shaping with tools or abrasives. The machined component is then reacted at high temperature in an atmosphere of nitrogen or ammonia to the fully nitrided condition, preferably in the manner described in our previous British patent specification No. 887,942. As is more fully disclosed therein, the nitriding process comprises an initial firing in a nitrogen atmosphere at a temperature of 1250° C. to 1350° C. to produce a rigid network of silicon nitride in the compact sufficient to retain the unconverted silicon in the compact, and a subsequent firing in an atmosphere of nitrogen at a temperature of about 1450° C. to completely nitride the silicon. The following schedule is preferred.

State I.—Nitriding of the compacted powder is initiated below the melting point of silicon at a temperature of 1250° C. for a period of up to 16 hours.

Stage II.—Nitriding is completed above the melting point of silicon at a temperature of approximately 1450° C. for three or four hours in order to convert all remaining silicon to silicon nitride. The spraying operation may be varied to impart even density throughout the thickness of the body or to give a variation in density, up to theoretical by plasma spray deposition on the outer layers. The physical and chemical nature of the sprayed deposit of silicon powder (and consequently the properties obtained from the final silicon nitride) is a function of the original powder composition and particle size, the nature of the flame employed and the distance of the gun from the heated former. The technique is particularly applicable to the production of shells, casings, bushes, etc. and size is only limited by subsequent furnace capacity for the nitriding operation. Examples of components that have been fabricated by this method are low density silicon nitride crucibles for metal technology and high density performance radomes for aircraft, heat shields of varying thickness and thermocouple sheaths for foundry use. As a further example of the technique, the surfaces of high porosity silicon nitride bodies, including foam, may be sealed and provided with a dense skin of silicon nitride by the spraying on of silicon powder, followed by nitriding. As an alternative production route silicon powder may be deposited on to the surfaces of silicon powder foam bodies by spraying, or by other means such as electrophoresis, followed by the nitriding of the whole to a composite silicon nitride component possessing a low density core with a high density outer skin or casing.

The accompanying drawing illustrates the apparatus used in the present invention. A hopper 1 feeds the silicon powder to the spray gun 2 whereby it is deposited as a layer 3 of silicon on to the former 4, on which a coating 5 of a soluble release agent has been previously applied.

As a specific example of the present invention the actual production of a probe funnel will now be described. The former for the funnel was first degreased and cleaned and then mounted in a chuck and rotated at 50 r.p.m. Air blast cooling was adjusted to strike tangentially at the rear of the mould and, with the cooling turned off, the mould was heated to 200° C. and then sprayed with sodium chloride at a spray distance of 12 ins. to give a salt deposit of .002 in. The mould was then reheated to 200° C., the air blast cooling started and spraying commenced using a low heat input nozzle spray pistol with a large metering jet. The metering valve was opened and a spraying distance of 7 ins. was maintained. During spraying the gun was moved rapidly over the surface of the mould, but allowance was made for large diameters of the mould to have greater dwell time than small diameters to ensure an even coating. Spraying was continued until the desired thickness of the silicon powder layer was reached and then the mould was cooled by allowing it to continue to rotate with the air blast cooling still on but with the flame gun turned off. When cooled, the mould was removed from the chuck and immersed in clean water. The compact was then gently freed from the mould with a slight twisting motion washed for three hours in running water and rinsed in distilled water. It was then tested for residual salt with silver nitrate solution, oven dried and then nitrided in a furnace.

Modifications of the process include spraying the mould with two spray guns, using nozzles of different configuration and angled to impact at the same point; joining pressed to pressed, pressed to sprayed, or sprayed to sprayed material, either nitrided or green and of similar or differing section, by flame spray deposition of silicon and subsequent nitriding. The forming of closed surface hollow bodies in silicon nitride or silicon, and the formation of passages or channels or other shapes in or on silicon nitride or silicon bodies by the flame spray deposition of silicon on substrates of soluble salt or other suitably removable formers.

We claim:

1. A method of producing a shaped body in silicon nitride to close tolerance comprising the steps of: projecting silicon powder by flame spray gun means on to a former preheated to about 200° C. coated with soluble release agent to form a silicon compact; immersing said former and compact in a solvent to dissolve said soluble release agent; removing said compact from said former; firing said compact in an atmosphere of nitrogen to a bisque sufficiently strong to enable said compact to be held in the jaws of a machine but still soft enough to permit the further shaping thereof with tools or abrasives; machine working the compact to the required shape; and firing the shaped compact in an atmosphere of nitrogen to completely nitride the silicon.

2. A method according to claim 1, wherein said shaped compact is initially fired in an atmosphere of nitrogen at a temperature between 1250° C. and 1350° C. to produce at least a rigid network of silicon nitride in said shaped compact sufficient to retain the remaining unconverted silicon in said shaped compact and then fired in an atmosphere of nitrogen at a temperature of about 1450° C. to completely nitride the silicon.

References Cited
UNITED STATES PATENTS

| | | | |
|---|---|---|---|
| 3,222,438 | 12/1965 | Parr et al. | 106—55 X |
| 3,219,730 | 11/1965 | Bliton et al. | 264—62 X |
| 2,861,900 | 11/1958 | Smith et al. | 117—105.2 X |
| 2,968,083 | 1/1961 | Lentz et al. | 156—89 UX |
| 2,974,388 | 3/1961 | Ault | 117—105.2 X |
| 2,636,828 | 4/1953 | Nicholson | 106—55 X |

ALFRED L. LEAVITT, Primary Examiner

C. K. WEIFFENBACH, Assistant Examiner

U.S. Cl. X.R.

117—93.1 PF; 264—59, 62, 65